Feb. 28, 1961  B. STAHMER  2,973,166
TURBINE PRINCIPLE HELICOPTER-TYPE BLADE FOR AIRCRAFT
Filed April 21, 1955  2 Sheets-Sheet 2
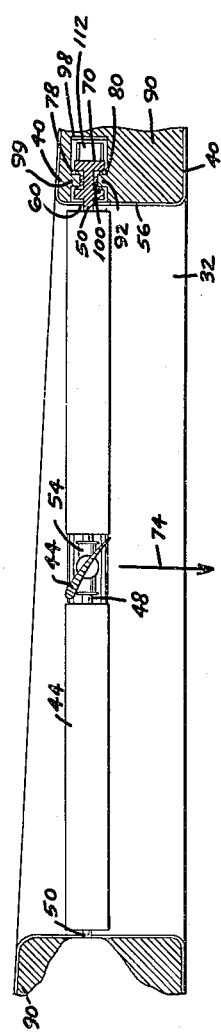
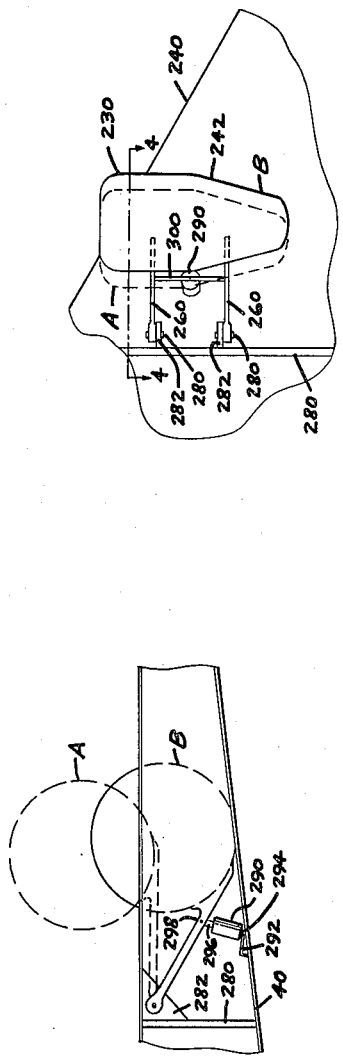
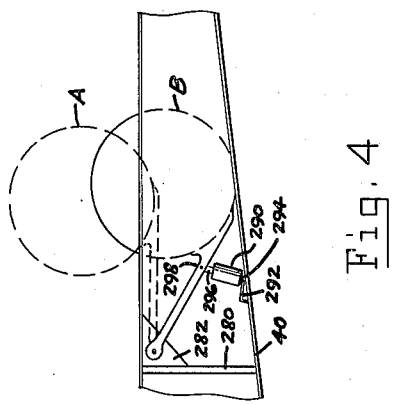
INVENTOR.
BY

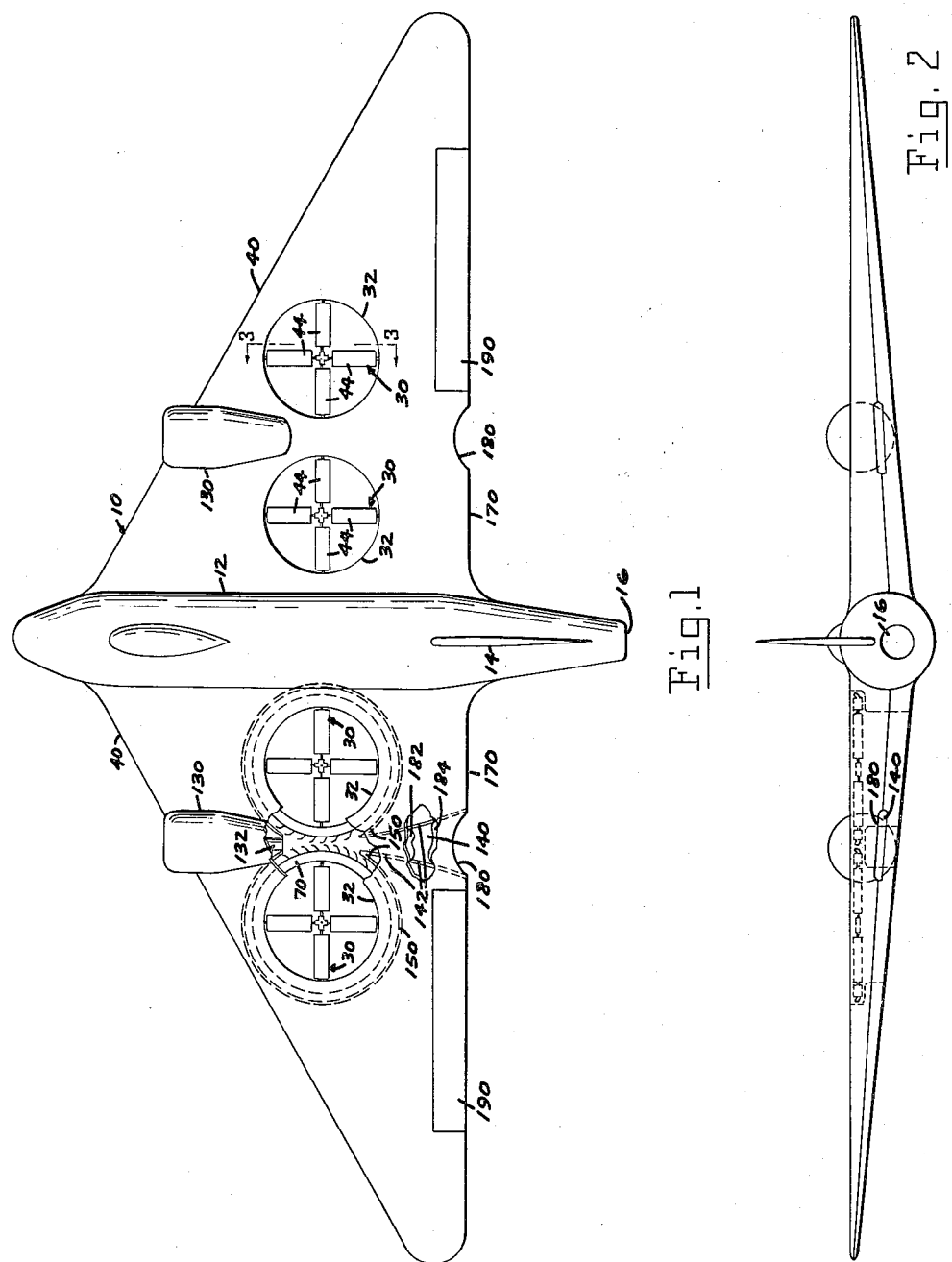

United States Patent Office 2,973,166
Patented Feb. 28, 1961

2,973,166

TURBINE PRINCIPLE HELICOPTER-TYPE BLADE FOR AIRCRAFT

Bernhardt Stahmer, 1509 Chicago St., Omaha, Nebr.

Filed Apr. 21, 1955, Ser. No. 502,933

2 Claims. (Cl. 244—23)

This invention relates to aircraft and more particularly it is the purpose of this invention to provide an application of helicopter blade principles to aircraft in a way such that greater power can be applied to the blades.

Particularly it is an object to appy jet power directly to turbine buckets on the rim of horizontal propellers without conduits bending the stream of jet gases and causing great power loss.

I do this by mounting the jet engine mostly forwardly of the center of the propeller on a tangent to the circular row of buckets and at a right angle to the axis of rotation of the propeller.

Yet a further objective is to provide means by which a jet engine can also be used for rearward thrusts simultaneously with its driving of vertical thrust propeller assemblies.

Another object is to provide means for making possible the alternate use of a jet engine for driving vertical thrust propeller assemblies, and alternately, through movement of the engine into another position, using a jet engine for rearward thrust exclusively and for forward motion.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

Figure 1 is a top plan view of the aircraft of this invention shown with portions removed and other portions shown in dotted lines.

Figure 2 is a rear elevation of the aircraft of Figure 1.

Figure 3 is a view-in-section taken along the line 3—3 of Figure 1.

Figure 4 is a view-in-section taken along the line 4—4 of Figure 5 although the view of Figure 5 is diagrammatic.

Figure 5 is a top plan view of the wing portion and aircraft around a jet engine in which a modification of the construction of Figure 1 is shown in which the jet engine is movable upwardly out of the wing area for delivering rearward thrusts, an upper position of the engine being shown in dotted lines.

The aircraft of this invention is generally indicated at 10 in Figure 1 and has a fuselage 12 having a tail 14 at its rearward end. In the fuseage is a jet engine, not shown, adapted to deliver a thrust of hot gases out of the rearward end 16 as is common in the art.

In accordance with this invention the aircraft 10 is provided with means for causing it to rise from the ground in a direciton moving upwardly much faster in proportion to its forward movement than would be possible without the means of this invention.

The means of this invention includes a plurality of vertical thrust propeller assemblies generally indicated at 30. The propeller assemblies 30 are preferably arranged in pairs and one or more pairs can be used in each of the wings 40 although in the aircraft illustrated at 10 only one pair is used in each wing 40. The assemblies 30 of each pair can be regarded, for identification, as being inboard and outboard of each other.

The wings 40 are of a type preferably extremely wide in the forward to rearward direction such as in the type of aircraft which has come to be known as a delta-wing aircraft. Such aircrafts are often without rearward wings as shown in Figure 1 although this factor is immaterial to this invention.

As best seen in Figure 1 the propeller assemblies 30 are each disposed in an opening 32 extending vertically through the wings 40. The openings 32 are preferably circular so as to be circular to the periphery of the path of circular rotation of the propeller assemblies 30.

The propeller assemblies 30 can comprise a plurality of propeller blades of any number and four blades 44 are used in the aircraft of Figure 1 by way of example.

The blades 44 are provided with supporting stub-axle members 48 and 50 at the inner and outer ends of each blade 44 respectively. The stub axles 48 can be fixed to the inner ends of the blades 44 and extend into a hub member 54. The hub member 54 is provided with recesses on many sides thereof for snugly and rotatably receiving the plurality of stub axles 48 at the inner ends of the blade 44.

The fit between the axles 48 and the hub 54 must be very good as it is intended that the propeller assemblies 30 be supported around their periphery as later described with their hubs 54 unsupported.

As best seen in Figure 3 the outer stub axles 50 extend outwardly into the wall 56 of the wing 40, the wall 56 being a vertical wall around the circumference of the respective opening 32. The wall 56 is of cylindrical shape for this reason and the wall 56 is provided with a circularly disposed surrounding opening 60 therethrough which is for the purpose of receiving the outer stub axles 50 therethrough. The stub axles 50 are slidable in the opening 60, preferably without touching the edges of the opening 60 although it is desirable that the fit be close.

The stub axles 50 are preferably rotatably attached to the propeller blades 44 for holding the blades 44 at a desired pitch.

The outer ends of the stub axles 50 are attached to suitable supporting means such as a rim mounting assembly generally indicated at 70. The assembly 70 is of an annular or ring shape generally and as seen in top plan view in Figure 1. The rim assembly 70 is necessarily a very strong construction as it receives the full force of the propeller assembly as it rotates and drives air downwardly in the direction of the arrow 74.

In cross-section the rim assembly is preferably of an H-shape as best seen in Figure 3. The purpose of this is to make it possible to support the rim assembly 70 on bearings so as to prevent undesired movement in every direction.

For this reason the rim assembly 70 has an upwardly opening recess 78 therein and the downwardly opening recess 80 is disposed on the under side of the rim 70. The recesses 78 and 80 are of circular shape extending around the rim 70. The wing 40 has suitable rim supporting means 90 in it. The rim supporting means 90 can comprise any suitable member 90 disposed entirely around the opening 32 and disposed in the wing 40 inwardly of the wall 56 of the opening 32. The rim supporting means or member 90 is diagrammatically shown in Figure 3 as will suffice to illustrate the principle. The rim supporting member 90 has an upwardly extending projection 92 on the lower side of an opening 98 which extends into the supporting member 90 and into the wing 40 for receiving the rim 70, the opening 98 being of substantially circular shape in top plan view for this purpose. The projection 92 extends into the recess 80 and a downwardly extending projection 99 extends downwardly from the upper side of the wall of the opening 98 and into the upper recess 78. The projections 92 and 99 are of circular shape in top plan view and suitable bearings 100 are mounted on the inner, top, the outer side and the bottom of the projection 99, and on the inner side, outer side and the top of the projection 92.

The bearings 100 serve to engage the inner and outer sides of the walls of the recesses 78 and 80 and also the upper side of the walls of the recess 78 and the lower side of the wall of the recess 80 respectively and thus prevent the propeller assembly from shifting to any side or upwardly or downwardly.

As best seen in Figure 3, the recess 98 extends outwardly from the rim assembly 70 a considerable distance and this is for the purpose of receiving turbine buckets 112. The buckets 112 are disposed in equidistantly spaced apart positions around the periphery of the rim assembly 70 being attached thereto in a rigid manner.

As best seen in Figure 1, force is applied against the turbine-like bucket 112 by means of jet engines 130. The engines 130 have centrally disposed exhaust tubes 132 in the illustrated example and the exhaust tubes 132 are best seen in the broken away portion of the engine 130 on the left wing in Figure 1. The rearward thrust of hot gases from the exhaust tube 132 strikes the bucket 112 causing rapid and powerful rotation of the propeller assemblies.

As best seen in Figure 1 the propeller assemblies are disposed in pairs, one assembly of a pair being disposed to the right and the other to the left of a repective jet engine 130 and with the forward to rearward shutters of the propeller assemblies 30 disposed rearwardly of the rearward end of the respective jet engines 130 whereby the bucket 112 can rotate without striking the rearward ends of a jet engine 130 and without striking buckets on the opposite propeller assembly. Except for these clearances it is desirable that the buckets of one propeller assembly be disposed close to the bucket of the opposite propeller assembly.

After the exhaust gases from a jet engine have passed across the bucket 112 they pass rearwardly out through an exhaust opening 140, best seen in Figure 1. The sides of the exhaust opening 140 are lined with walls 142 formed of material capable of withstanding the heat of the exhaust gases. The walls 142 extend from the rearward edge of the wing 40 on the right and left sides of the opening 140 forwardly to a point disposed behind the forward to rearward centers of the propeller assemblies 30 whereby the forward ends of the walls 142 are spaced apart. However, the rearward ends of the walls 142 are preferably spaced apart a greater distance whereby the expansion of the gases rushing out through the tapered opening 140 causes increased forward thrust.

The walls 142 are joined on their forward ends by curved walls 150 shown partially in dotted lines in Figure 1 and partially in full lines. The walls 150 extend around the rearward side of each respective propeller assembly, then forwardly and around the forward side respectively, joining the edges of the exhaust tubes 132 of the engines 130. The walls 150 are likewise preferably formed of material capable of withstanding the intense heat of the exhaust gases of the jet engine and further are preferably formed like the walls 142, also in a manner capable of insulating the area receiving the buckets 112 from the reminder of the wings so as to avoid harm from the intense heat.

As best seen in Figure 2, the aperture in the rearward edge 170 of the wing 140 can be disposed below the center of the exhaust tube 132 of the jet engine 130 whereby the opening 180 can be joined by the passage 140 and the passage 140 can incline downwardly from the tube 132 to the opening 180 at the rearward edge 170 of the wing. In this way the hot gases from the jet engine which have passed over the bucket 112 and through the passage 140 are directed downwardly to a certain extent to further use this force to carry the aircraft upwardly.

It will be understood that the passages 140 must also be lined with suitable bottom and top walls and for this reason a top wall has been indicated at 182 in Figure 1 and a bottom wall has been indicated at 184 in Figure 1. These walls must be heat resistant and is it very desirable that they also be insulating. It is to be understood that the walls 142, 150, 182 and 184 may very likely always be made of a double layer, the inner layer being of heat resistant material, and the outer layer being of an insulating material. This is not illustrated in detail here as it is not believed to be one of the main features of the invention.

As best seen in Figure 1, the opening 180 would likely have a wall of a concave curve shape as seen in top plan view and that at the rearward edge 170 of the wing. The openings 180 need not interfere with hinged controllable members 190 in the rearward edge 170 of the wing as are customarily used for directing the aircraft upwardly or downwardly.

As best seen in Figure 5 it is a modification of the invention that the jet motors 130 be removable and so in Figure 5 the jet motor is given the numeral 230 to distinguish from the motors 130. The wing is given the numeral 240 as it is different from the wing 40 with respect to an opening indicated at 242 and extending around the motor 230 for permitting the motor 230 to be raised upwardly out of the wing 240 sufficiently for its rim to have its exhaust portion disposed completely above the wing 240, the motor 230 being in the position shown at a in Figure 4 when it is disposed in the upward position. When the motor is in the a position its entire thrust is directed rearwardly for forward motion of the aircraft and none of the thrust is directed at the buckets 112 whereby no power is applied to the vertical thrust propeller assembly 30.

As best seen in Figures 4 and 5, the motor 230 is supported on suitable supporting arms 260, which latter are diagrammatically shown as extending inwardly of the aircraft and being attached at their outer ends to the inner edge side of the motor 230.

The inner ends of the arms are pivotally attached by means of pins 280 to suitable mounting brackets 282 which latter are attached to suitable structure members such as indicated at 284 fixed rigidly and securely to the wing 40.

Pivot members 280 are in alignment along the horizontal axis whereby the motor swings upwardly to the a position from the downwardly disposed b position when a suitable means such as a hydraulic jack 290 is actuated. The jack 290 is suitable and pivotally attached to the wing 40 by means of a web 292 and pivot 294.

The upper end of the hydraulic jack 290 has a piston 296 fixed to a pivot 298 to a member 300 disposed connected to each arm 260 whereby the hydraulic cylinder 290 can be disposed between the arm 260. This structure is diagrammatic and illustrative of principles although it is realized that when engineering details are worked out the form will be somewhat different.

It will be seen that the jet engines 130 each comprise what can be defined as the means for developing a driving stream of gas, and the exhaust tubes 132 of each jet engine can be described as a means for delivering a jet stream of gas at the buckets of each propeller assembly. It will be seen that such stream is directed tangentially to the circles of buckets in each assembly, and that the circles of buckets are each disposed adjacent the outer periphery of each respective assembly and attached to each propeller assembly concentrically.

It will be further seen that the gas stream developing and delivering means represented by the engines 130 and their exhaust tubes 132 are each in operation substantially directly delivering gas to the respective buckets and are free of substantial stream direction diverting means between a position of gas stream development in the jet engines 130 and the turbine buckets, such gas stream delivering means represented by the exhaust tubes 132 being definable as being free of any stream direction diverting means between the position of gas stream development in the jet engine and the turbine buckets to which the stream is delivered.

As thus described it will be seen that this invention has provided a sufficient disclosure of new principles as to fulfill the objects of the invention above set forth.

From the foregoing description, it is thought to be obvious that a turbine principle helicopter-type blade for aircraft constructed in accordance with my invention is particularly well adapted for use and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In an aircraft, two closely spaced vertical thrust propeller assemblies, said assemblies being on a same side of the aircraft rotating in approximately horizontal planes when said aircraft is upright, each assembly having a rim around its periphery and attached thereto, means rotatably mounting said propeller assemblies on said aircraft, and a plurality of spaced apart turbine-like buckets disposed around the outer periphery of said rim, said two propeller assemblies being disposed alongside each other and being closely spaced apart with respect to each other and being arranged for delivering downward thrusts of air at times when they are rotating in opposite directions, said propeller assemblies being disposed inboard and outboard of each other respectively and with respect to said aircraft, and a jet engine mounted on said aircraft and disposed at least mostly forwardly of the centers of and between said propeller assemblies, said jet engine being disposed in a position closely spaced from said assemblies with its axis horizontal and on a tangent to the peripheries of said rims so as to directly and simultaneously deliver the force of jet gases with efficiency at the buckets of each assembly.

2. In an aircraft, two closely spaced vertical thrust propeller assemblies, said assemblies being on a same side of the aircraft rotating in approximately horizontal planes when said aircraft is upright, each assembly having a rim around its periphery and attached thereto, means rotatably mounting said propeller assemblies on said aircraft, and a plurality of spaced apart turbine-like buckets disposed in a circle adjacent the outer periphery of each respective assembly and attached thereto concentrically, said two propeller assemblies being disposed alongside each other and being closely spaced apart with respect to each other and being arranged for delivering downward thrusts of air at times when they are rotating in opposite directions, said propeller assemblies being disposed inboard and outboard of each other respectively and with respect to said aircraft, and means mounted on said aircraft for developing and delivering a driving stream of gas at the buckets of each propeller assembly and directed tangentially to the said circles of buckets respectively for driving said assemblies in opposite directions for downward thrusts of air, said gas streams developing and delivering means substantially directly delivering gas to said buckets and being free of any substantial stream direction diverting means between a position of gas stream development and said turbine buckets.

References Cited in the file of this patent

UNITED STATES PATENTS

| 1,809,271 | Goddard | June 6, 1931 |
| 2,397,998 | Goddard | Apr. 9, 1946 |
| 2,633,311 | Van Zandt | Mar. 31, 1953 |

FOREIGN PATENTS

| 340,357 | France | May 10, 1904 |
| 1,068,404 | France | Feb. 3, 1954 |